No. 878,194. PATENTED FEB. 4, 1908.
F. A. DINSMORE.
WATER MOTOR.
APPLICATION FILED OCT. 22, 1906. RENEWED DEC. 26, 1907.
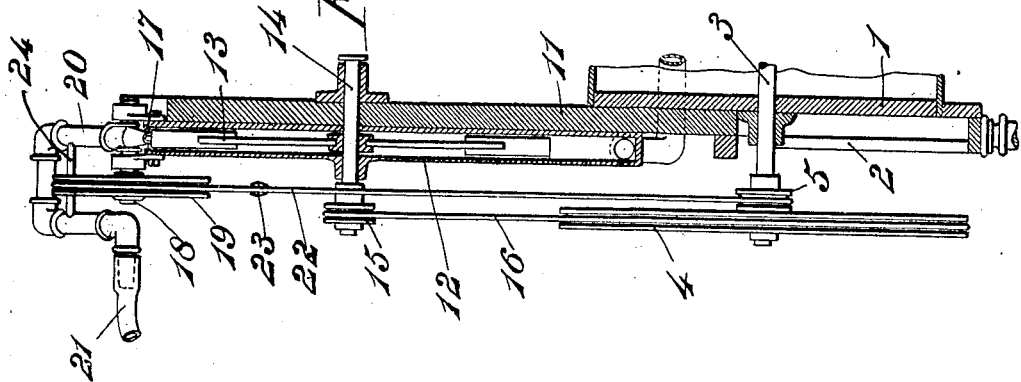
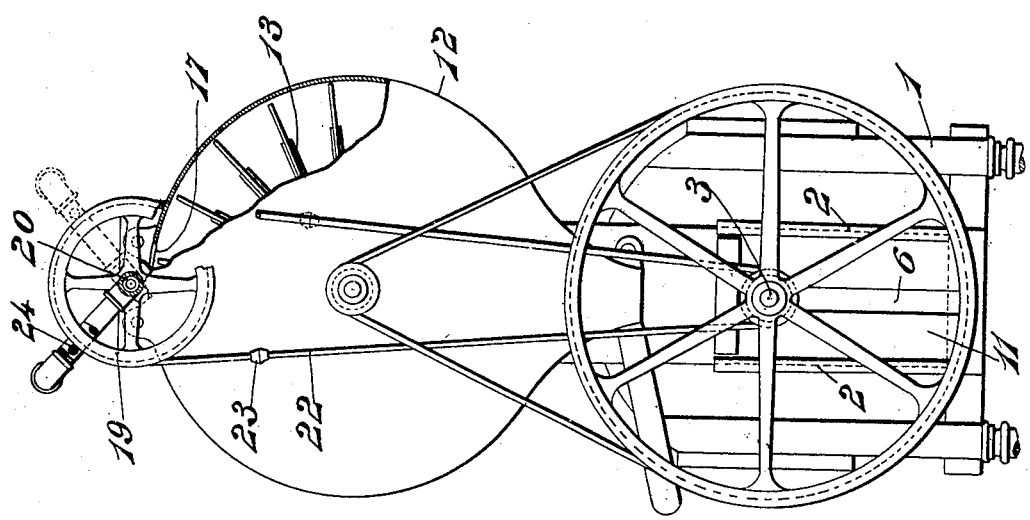
WITNESSES:
Frank A. Dinsmore,
INVENTOR
By
ATTORNEYS

UNITED STATES PATENT OFFICE.

FRANK A. DINSMORE, OF FREDONIA, NEW YORK.

WATER-MOTOR.

No. 878,194.   Specification of Letters Patent.   Patented Feb. 4, 1908.

Original application filed March 9, 1906, Serial No. 305,109. Divided and this application filed October 22, 1906, Serial No. 340,057. Renewed December 26, 1907. Serial No. 408,151.

*To all whom it may concern:*

Be it known that I, FRANK A. DINSMORE, a citizen of the United States, residing at Fredonia, in the county of Chautauqua and State of New York, have invented a new and useful Water-Motor, of which the following is a specification.

This invention relates to water operated motors and is a division of an application filed in the United States Patent Office by me on Mar. 9, 1906, Serial No. 305,109.

The object of the invention is to provide a motor which is of simple, durable and inexpensive construction and which is particularly adapted for operating light machinery such as washing machines.

A still further object is to provide a motor having means for automatically reversing it at predetermined intervals so that the mechanism actuated thereby will be caused to operate in opposite directions intermittently.

With the above and other objects in view the invention consists of certain novel features of construction and combinations of parts which will be hereinafter more fully described and pointed out in the claims.

In the accompanying drawings is shown the preferred form of the invention.

In said drawings: Figure 1 is a front elevation of the motor, a portion of the nozzle, idler, pulley and motor casing being broken away; and Fig. 2 is a vertical section through the motor.

Referring to the figures by characters of reference, 1 is a suitable support having guide cleats 2 and journaled within this support and between the cleats is a shaft 3 one end of which has a large pulley 4 and a small pulley 5 keyed or otherwise secured to it, Disposed between the cleats 2 is a slidable standard 11 on which is supported the casing 12 of a water wheel 13. This standard has a longitudinal slot 6 therein through which the shaft 3 projects. The wheel 13 is secured to a shaft 14 one end of which extends beyond the casing and has a pulley 15 keyed or otherwise fastened to it and extending over this pulley is a belt 16 which is also mounted on the large pulley 4 on shaft 3.

Rotatably mounted across the center of the inlet 17 of the casing 12 is a shaft 18 having a pulley 19 at one end thereof, while secured to its other end is the outlet end of a U-shaped nozzle 20. The other end of this nozzle extends to a point in alinement with the shaft 18 where it is adapted to be connected by means of hose 21 or any other suitable tubular device with a faucet or other source of water supply. A belt 22 is mounted on the pulley 19 and on the small pulley 5, and this belt has a trip 23 thereon. A stop strip 24 connects the opposite arms of the nozzle 20 and rests close to pulley 19 so that the trip 23 cannot pass thereunder but will come into contact therewith.

In operation water is directed into the nozzle 20 and will be discharged against the water wheel 13 so as to cause it to rotate in one direction. Motion will therefore be transmitted from the pulley 15 to the pulley 4 through belt 16 and the small pulley 5 will of course be rotated and cause the belt 22 to rotate the pulley 19. As this pulley 19 is loosely mounted on shaft 18 it will rotate until the trip 23 is brought into contact with the stop strip 24 whereupon the nozzle 20 will be swung around so as to direct the water against the opposite portion of the water wheel. The motion of said wheel will be promptly reversed as will be that of the cylinder within the casing 1. The trip 23 on the belt 22 will therefore be carried downward under pulley 5 and thence upward against the other side of the stop strip 24 whereupon the nozzle will be swung back to its initial position to again reverse the motor. This operation will be continued indefinitely and the mechanism is preferably so proportioned that several revolutions of the shaft 3 will be produced before each reversal of the motor.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:

1. The combination with a shaft; of a motor wheel removed from said shaft, means for transmitting motion from said wheel to the shaft, means for uninterruptedly directing motive fluid against the wheel, and means operated by the wheel for actuating the fluid directing means to reverse the wheel.

2. The combination with a shaft; of a motor wheel, a nozzle for directing water thereagainst, means for transmitting motion from the wheel to the shaft, and mechanism operated by the wheel for shifting the nozzle at predetermined intervals to reverse the wheel.

3. The combination with a shaft; of a water motor, mechanism for transmitting motion from the motor to the shaft, a nozzle for directing water into the motor, and means driven by the motor for shifting the nozzle to reverse the motor.

4. The combination with a shaft; of a motor, mechanism for transmitting motion therefrom to the shaft, a nozzle for directing motive fluid into the motor, and a nozzle shifting device operated by the motor for contacting with and shifting the nozzle to reverse the motor.

5. The combination with a shaft; of a motor, mechanism for transmitting rotary motion from the motor to the shaft, a nozzle pivotally mounted upon the motor for directing fluid thereinto, and a trip actuated by the motor and adapted to contact with and shift the nozzle to reverse the motor.

6. The combination with a rotatable shaft; of a motor, mechanism for transmitting rotary motion therefrom to the shaft, a nozzle, an idler pulley mounted adjacent the nozzle, a belt rotatably mounted upon the idler pulley and rotatable with the shaft, a trip upon the belt, and means connected to the nozzle adapted to be contacted by the trip to shift the nozzle.

7. The combination with a rotatable shaft; of a motor, means for transmitting rotary motion therefrom to the shaft, a pivoted nozzle for directing fluid into the motor, an idler pulley disposed adjacent to the nozzle, a belt operated by the shaft and mounted on the idler, a trip carried by the belt, and a stop movable with the nozzle and in the path of and adapted to be actuated by the trip to shift the nozzle.

8. The combination with a shaft; of a motor, mechanism for transmitting rotary motion from the motor to the shaft, a nozzle pivoted upon and adapted to direct fluid into the motor, a stop movable with the nozzle, and a trip operated by the motor for contacting with and shifting the stop.

9. The combination with a shaft; of a motor, mechanism for transmitting motion therefrom to the shaft, a nozzle pivoted upon and adapted to direct fluid into the motor, an idler pulley mounted adjacent the nozzle, a stop extending from the nozzle and adjacent the pulley, a belt mounted on the pulley and driven by the shaft, and a trip upon the belt adapted to contact with and shift the stop.

10. The combination with a motor wheel, and means for uninterruptedly directing motive fluid upon the wheel; of mechanism operated by the wheel for actuating said fluid directing means at predetermined intervals to reverse the wheel.

In testimony that I claim the foregoing as my own, I have hereto affixed my signature in the presence of two witnesses.

FRANK A. DINSMORE.

Witnesses:
CHAUNCEY M. RATHBUN,
J. M. PETTIT.